Aug. 23, 1932.  T. FARLEY  1,873,832

FRUIT CLEANING APPARATUS

Filed Nov. 14, 1930

Inventor

TREFFLE FARLEY

By R. J. Whitaker his Attorney

Patented Aug. 23, 1932

1,873,832

UNITED STATES PATENT OFFICE

TREFFLE FARLEY, OF SELAH, WASHINGTON, ASSIGNOR OF ONE-HALF TO WILLIAM McGONAGLE, OF YAKIMA, WASHINGTON

FRUIT CLEANING APPARATUS

Application filed November 14, 1930. Serial No. 495,736.

The invention contemplates improvements over my Patent 1,748,872, dated February 25, 1930, for fruit washing machines, and over the invention shown and claimed in my co-pending application for patent for fruit washer and drier, filed May 20, 1929, Serial No. 364,651.

This invention particularly relates to a novel rinser for vegetables and fruit. The object of the apparatus is to wash fruit, particularly apples, so that the same may be pleasing in appearance for marketing and wherein the fruit has been thoroughly cleaned. Another object is the handling and washing of apples to cause as little bruising and damage as possible.

Further objects and advantages of the fruit washing machine will appear in the following description, the apparatus being shown in an acompanying drawing wherein.

Figure 1:
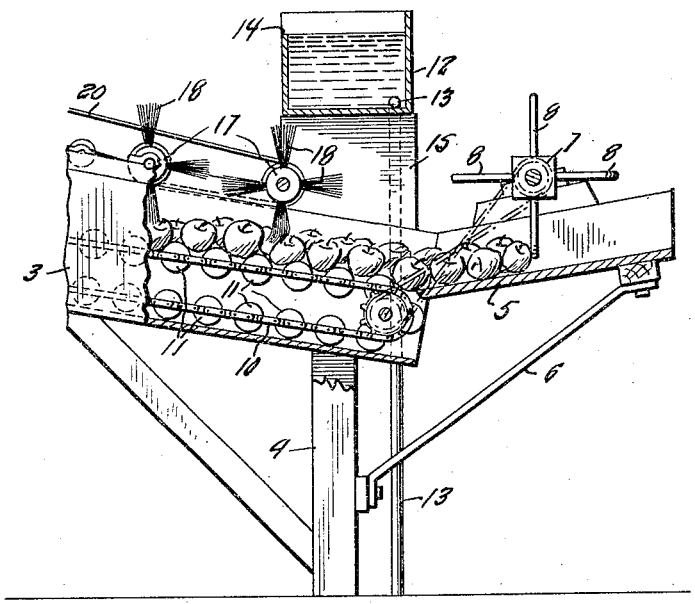
Figure 1 is a fragmental elevation, partly in section.
Figure 2:
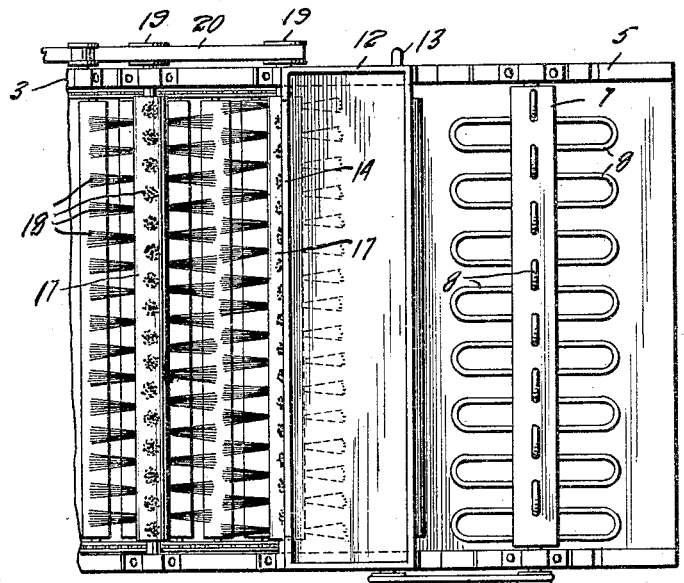
Fig. 2 is a fragmental plan view of the apparatus.

In the drawing, wherein the same part is designated by the same reference numeral, 3 is an inclined trough supported on legs or standards 4. Approaching and leading to the trough 3 is an inlet trough or chute 5 attached to the sides of trough 3 and supported by brackets 6.

Apples or other fruit or vegetables are fed by a wheel 7, having radial looped resilient arms 8 driven by belt 9 from a conveyor chain 10 (or endless belt) comprising lateral spaced rollers 11.

A water tank 12 having an inlet pipe 13 has one short longitudinal side forming a spillway 14. The tank is elevated in any suitable manner, but is shown in the drawing as supported on blocks 15, which are attached to the sides of the trough 3.

Below the spillway 14 and above the rollers 11 is a series of brush rollers 17, having radial brushes 18. The ends of the brush rollers 17 are provided with pulleys 19 driven by belt 20.

Any suitable source of power may be used to actuate the moving parts of the apparatus. The troughs may be of any capacity and the brushes may be of any type. The washing fluid may be clear water or an acid bath to act as an insecticide or germicide. Only a small amount of power is necessary, and the parts shown may be readily disassembled or replaced. The drawing shows apples being cleaned by brushing and washing, but no limitation is made to the products to be cleaned, as obviously the same may be vegetables or any other appropriate type of fruit.

The invention is not limited in its broader phases to the exact details of construction described above and shown in the drawing, but the invention also includes such changes and modifications as lie within the spirit and scope of the appended claim.

What I claim as new and desire to secure by Letters Patent of the United States is:

In a fruit washing apparatus, a trough, an endless conveyor moving longitudinally in said trough, a series of brushes extending transversely across said trough above said conveyor and rotatably mounted, a reservoir above the inlet end of said trough extending transversely thereof, and having its inner side wall of less height than its other walls, whereby fluid may flow out of the trough and down onto the brushes and fruit in the trough, a feed trough communicating with the inlet end of the first trough, and means for moving fruit out of the feed trough onto said conveyor.

TREFFLE FARLEY.